Sept. 9, 1958     H. HALL     2,851,187
CONTAINER AND BAIL EAR CONSTRUCTION
Filed Dec. 3, 1956
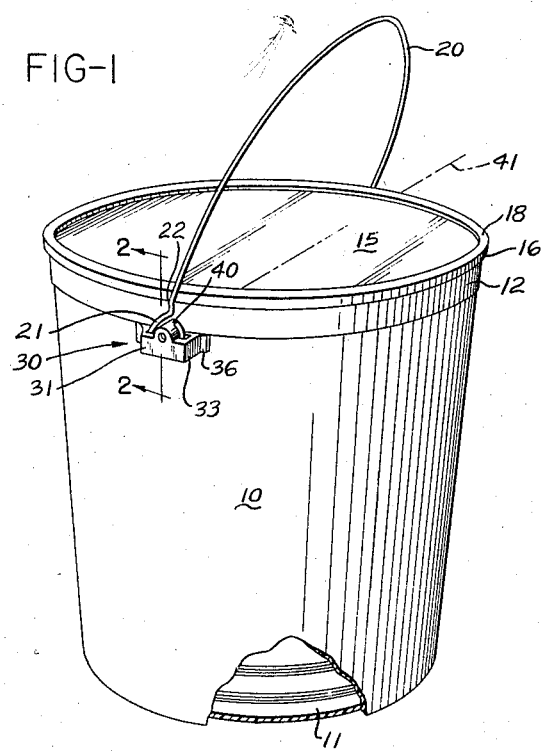
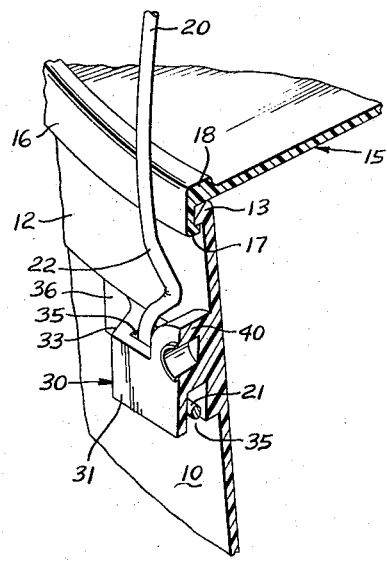
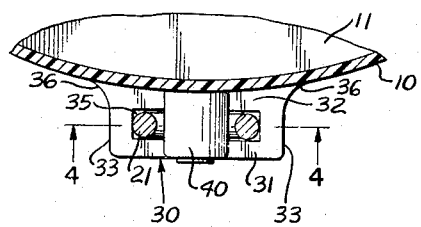
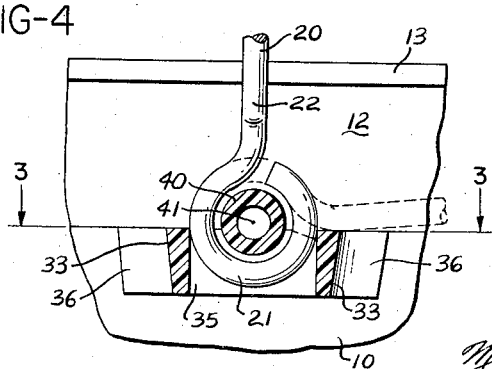
INVENTOR.
HUGH HALL
BY
Marechal, Biebel, French & Bugg
ATTORNEYS

United States Patent Office 2,851,187
Patented Sept. 9, 1958

2,851,187

CONTAINER AND BAIL EAR CONSTRUCTION

Hugh Hall, Urbana, Ohio, assignor to Therm-O-Plastic Products, Inc., Urbana, Ohio, a corporation of Ohio Application December 3, 1956, Serial No. 625,767

3 Claims. (Cl. 220—91)

This invention relates to containers, particularly to containers molded of flexible plastic material, and also to an improved bail ear construction for attaching carrying bails to such containers.

A primary object of the invention is to provide a container, preferably of molded flexible plastic material such as polyethylene, having a rim defining an opening in the top thereof, and which container includes bail ears molded integrally with the outer surfaces of opposite side walls of the container below the rim to provide for hinged attachment of a handle to the container, and to define a hinge axis for the bail spaced below the rim providing for swinging the entire bail below the rim.

Another object of the invention is to provide such a container and bail construction wherein the bail includes portions formed to extend outwardly around the container rim providing clearance for reception of a lid about said rim.

A further object of the invention is to provide such containers of inverted frustoconical shape capable of being stored in nested relation, and wherein the molded bail ears include parts forming at the lower ends thereof abutments for engaging the rim of a similar such container to support the containers in nested relation, and wherein the bail ears also form abutment stops adjacent the bail hinge axis for supporting the bail in a generally horizontal position to one side of the container, particularly during storage.

Other objects and advantages of the invention will be apparent from the following description, the accompanying drawing and the appended claims.

In the drawing—

Fig. 1 is a perspective view, partly broken away, showing a typical container provided with a bail ear structure in accordance with the present invention;

Fig. 2 is an enlarged fragment of Fig. 1 taken in view substantially on the line 2—2 of Fig. 1;

Fig. 3 is a further enlarged fragmentary view taken in view as indicated by the line 3—3 of Fig. 4; and Fig. 4 is a fragmentary view on the line 4—4 of Fig. 3.

Referring to the drawings, which illustrates a preferred embodiment of the invention, Fig. 1 shows a container of the pail type including side walls 10 extending upwardly from a bottom wall 11 and preferably molded integrally therewith from a suitable plastic material such as polyethylene. The bottom wall 11 is shown as including integral concentric corrugations for increased rigidity, and the side walls 10 are shown as slightly frusto-conical for convenience in stacking a plurality of such containers in nested relation.

The side walls 10 of the container include a thickened strip 12 extending around the upper portion thereof and terminating in an outwardly turned rim 13. A lid 15 for the container, which may also be formed of molded plastic material, includes a depending flange 16 terminating in an inwardly turned lip 17 proportioned to fit closely under the rim 13 on the container. The lid 15 is also shown as including a thickened ring portion 18 around the upper part of its outer periphery for additional strength and rigidity.

The present invention is especially concerned with the provision of a suitable means for attaching to the container a carrying bail 20 of heavy wire or like suitable material having suitably constructed ends such as hooked ends 21 and outwardly bent portions 22 adjacent ends 21 to provide clearance between rim 13 and bail 20. More specifically, the invention is concerned with securing the carrying bail 20 to the container in such manner that the lid 15 and handle are free from possible interference with each other in all positions of the handle. Additionally the invention seeks to provide a mounting for the handle on the container which is adequately reinforced for a long service life and which also makes it possible to swing the handle sufficiently below the rim of the container when stacking a plurality of empty containers in nested relation.

All of the objectives are successfully achieved by means of the mounting construction shown in the drawings, this construction including a pair of generally rectangularly shaped retaining pieces 30 comprising front and rear walls 31 and 32, respectively, and side walls 33. Retaining pieces 30 are located at opposite points on the side walls of the container and preferably integral therewith. Although rear walls 32 are shown as being of substantial thickness, where the construction material used has sufficient inherent strength and rigidity to prevent bending or tearing due to the forces imparted to the container through the mounting construction, the thickness can be substantially reduced or even eliminated.

As shown in Figs. 3 and 4, the piece 30 is provided with an opening 35 extending vertically therethrough which is of essentially rectangular dimensions in both vertical and horizontal section. The opposite side walls 33 which define the lateral limits of opening 35 increase in thickness from bottom to top to match the tapered construction of the container as a whole and fair outwardly at 36 to merge with the surrounding areas of the side walls 11. Each of the pieces 30 is shown as located just below the thickened portion 12 of the side wall, and by way of example, a suitable overall vertical dimension for the thickened portion portion 12 is approximately 1.25 inches in a standard 10-quart pail.

Each of the mounting units for the ends of the handle 20 includes a shaft 40 which is integral with the pail and the piece 30, and which preferably has slightly less than one-half of its vertical extent located below the upper plane of the part 30. These parts are so proportioned, as shown in Fig. 4, that the hooked end 21 of the handle bail will fit freely between the shaft 40, front and rear walls 31 and 32 and side walls 33. Additionally, the relative positioning of the parts is such that when the handle is swung downwardly from its raised position for use, it will be stopped in a position very close to the horizontal by engagement with the upper surface of a wall 32. Shaft members 40 thus cooperate to define a hinge axis 41 which extends transversely through the container and provides for swinging the entire bail 20, including the ends 21, below the rim 13 to preclude interference of these parts with lid 15 when it is applied.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a unitary plastic container having side walls extending upwardly from a bottom wall and a rim defining an opening in the top thereof, the combination of bail ears on opposite of said side walls for attaching a carrying bail having hooked end portions to said container, each of said bail ears comprising a generally rectangularly shaped retaining piece integral with the outer surface of one of said side walls below said rim and having generally vertically extending apertures for receiving the hooked ends of the carrying bail, shaft members integral with said container and extending across said apertures to provide hinge pins for the hooked ends of the bail defining a hinge axis extending transversely through said container providing for swinging the entire bail below said rim, and the upper edge of each of said retaining pieces being generally horizontally aligned with said hinge axis to provide stops for retaining the bail in a generally horizontally extending position.

2. In a unitary plastic container having side walls extending upwardly and outwardly from a bottom wall and an outwardly extending rim defining an opening in the top thereof the combination of a carrying bail having hooked end portions, bail ears on opposite of said side walls for attaching said bail to said container and each comprising a generally rectangularly shaped retaining piece integral with the outer surface of one of said side walls and having completely encompassed generally vertically extending apertures of substantial vertical dimension for receiving said hooked ends of said bail, shaft members integral with said container walls and extending across the upper portion of said apertures through said hooked bail ends to provide hinge connections between said bail and said container defining a hinge axis extending transversely through said container, the lower edges of said retaining pieces extending sufficiently below said shaft members to enclose the lower portion of said hooked ends and provide abutments for engaging the rim of a like container when nesting a plurality of such containers, the upper edge of each of said retaining pieces being generally horizontally aligned with said hinge axis to provide stops for retaining said bail in a generally horizontally extending position, and said bail also having outwardly bent portions adjacent said hooked ends spacing said bail from said rim to provide clearance for reception of a lid over said rim to close said container.

3. In a unitary plastic container having side walls extending upwardly from a bottom wall and a rim defining an opening in the top thereof, the combination of bail ears on opposite of said side walls for attaching opposite ends of a carrying bail to said container, each of said bail ears comprising a generally U-shaped retaining piece integral with the outer surface of one of said side walls below said rim and having generally vertically extending apertures for receiving the opposite ends of the carrying bail, shaft members integral with said container and extending across said apertures to provide hinge pins for the opposite ends of the bail defining a hinge axis extending transversely through said container providing for swinging the entire bail below said rim, and the upper edge of each of said retaining pieces being generally horizontally aligned with said hinge axis to provide stops for retaining said bail in a generally horizontally extending position.

References Cited in the file of this patent
UNITED STATES PATENTS

| | | |
|---|---|---|
| 396,826 | Mayer | Jan. 29, 1889 |
| 1,514,930 | Reynolds | Nov. 11, 1924 |
| 1,568,359 | Assman | Jan. 5, 1926 |
| 1,682,048 | Levien | Aug. 28, 1928 |